US012613114B2

(12) United States Patent
Zakrzewski et al.

(10) Patent No.: US 12,613,114 B2
(45) Date of Patent: Apr. 28, 2026

(54) SENSOR SYSTEMS AND DONGLES THEREFOR

(71) Applicant: Simmonds Precision Products, Inc., Vergennes, VT (US)

(72) Inventors: Radoslaw R. Zakrzewski, Lakeville, MN (US); Caitlin M. Calderon, Bristol (GB); Christopher Fitzhugh, Essex Junction, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 284 days.

(21) Appl. No.: 18/200,408

(22) Filed: May 22, 2023

(65) Prior Publication Data

US 2024/0393151 A1 Nov. 28, 2024

(51) Int. Cl.
*G01D 18/00* (2006.01)
*G01D 21/02* (2006.01)

(52) U.S. Cl.
CPC .................................. *G01D 18/008* (2013.01)

(58) Field of Classification Search
CPC ...... G01D 18/008; G01D 18/00; G01D 21/02; G01D 5/2449
USPC ......................................................... 73/1.01
See application file for complete search history.

(56) References Cited

U.S. PATENT DOCUMENTS

| | | | |
|---|---|---|---|
| 10,456,051 | B2 | 10/2019 | Corl et al. |
| 11,221,266 | B2 | 1/2022 | Mackenzie et al. |
| 11,324,387 | B2 | 5/2022 | Langell et al. |
| 11,435,251 | B2 | 9/2022 | Numata et al. |
| 2010/0077829 | A1 | 4/2010 | Batista |
| 2014/0187985 | A1 | 7/2014 | Corl et al. |
| 2020/0013464 | A1 | 1/2020 | Wood et al. |
| 2021/0247259 | A1 | 8/2021 | Altieri et al. |
| 2022/0003581 | A1 | 1/2022 | Fox et al. |
| 2022/0205851 | A1 | 6/2022 | Davar et al. |

OTHER PUBLICATIONS

Extended European Search Report for EP Application No. 24176660. 9, dated Oct. 10, 2024, 9 pages.

*Primary Examiner* — Laura Martin
*Assistant Examiner* — Anthony W Megna Fuentes
(74) *Attorney, Agent, or Firm* — Tucker Ellis LLP

(57) ABSTRACT

In accordance with at least one aspect of this disclosure, a dongle for a sensor system can include a pass-through signal carrier configured to allow signals from a sensor discretely associated with the dongle to pass through the dongle to a data concentrator via a first connection, and a non-volatile memory configured to connect to the data concentrator via a second connection. The nonvolatile memory can include calibration data for the sensor that is associated with the dongle.

10 Claims, 2 Drawing Sheets

SENSOR SYSTEMS AND DONGLES THEREFOR

FIELD

This disclosure relates to sensor systems and dongles therefor.

BACKGROUND

Sensing devices often require sensor-by-sensor calibration, necessitating recording and storage of calibration coefficients and/or equations that are device-specific. For example, MEMS (micro-electromechanical systems) pressure sensors can require such pre-deployment calibration. Sensor response data is recorded from each physical sensor under the entire range of relevant environmental conditions (e.g. pressure and temperature) and calibration equations are derived for that specific sensor. In operation, flight software may need to apply different calibration coefficients or equations to different sensors of the same type. In particular, if multiple sensors of the same type are used by the same aircraft subsystem, then the flight software can apply a different set of calibration coefficients depending on which specific physical sensors are installed on the aircraft. This set of calibration coefficients may be different for different physical aircrafts, as different individual sensors are installed on different aircrafts. Moreover, if a sensor must be replaced in the field, due to a failure, then a new set of calibration coefficients may need to be used for the new replacement unit. Throughout aircraft operation, flight software should also correctly associate appropriate calibration coefficients with their corresponding sensing channels, as each channel may need its own specific calibration coefficients tied to the specific physical sensor.

Such conventional methods and systems have generally been considered satisfactory for their intended purpose. However, there is still a need in the art for improvements. The present disclosure provides a solution for this need.

SUMMARY

In accordance with at least one aspect of this disclosure, a dongle for a sensor system can include a pass-through signal carrier configured to allow signals from a sensor discretely associated with the dongle to pass through the dongle to a data concentrator via a first connection, and a non-volatile memory configured to connect to the data concentrator via a second connection. The nonvolatile memory can include calibration data for the sensor that is associated with the dongle.

In certain embodiments, the first connection is different than the second connection. In certain embodiments, the first connection can be an optical connection and wherein the pass-through signal carrier includes an optical pathway configured to allow optical signals to pass therethrough.

In certain embodiments, the optical pathway can be an optical fiber. In certain embodiments, the second connection can be an electrical connector. In certain embodiments, the nonvolatile memory can be connected to the electrical connector to provide digital information to the data concentrator. In certain embodiments, the digital information can include sensor calibration data for a discretely associated sensor. In certain embodiments, the pass-through signal carrier is configured to connect to a cable to connect to the sensor.

In accordance with at least one aspect of this disclosure, a sensor system can include a sensor and a dongle discretely associated with the sensor and configured to connect to the sensor. The dongle can include any suitable dongle disclosed herein, e.g., as described above.

In certain embodiments, the system can include a cable. The pass-through signal carrier can be configured to connect to the cable to connect to the sensor. In certain embodiments, the sensor is a passive sensor.

In certain embodiments, the system can include the data concentrator. In certain embodiments, the data concentrator can be configured to interrogate the sensor with an optical signal and to receive the digital information from the non-volatile memory.

In certain embodiments, the system can include one or more additional sensors and one or more additional dongles associated with each additional sensor. In certain embodiments, the data concentrator can be configured to interface with the plurality of dongles to communicate with the plurality of sensors.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
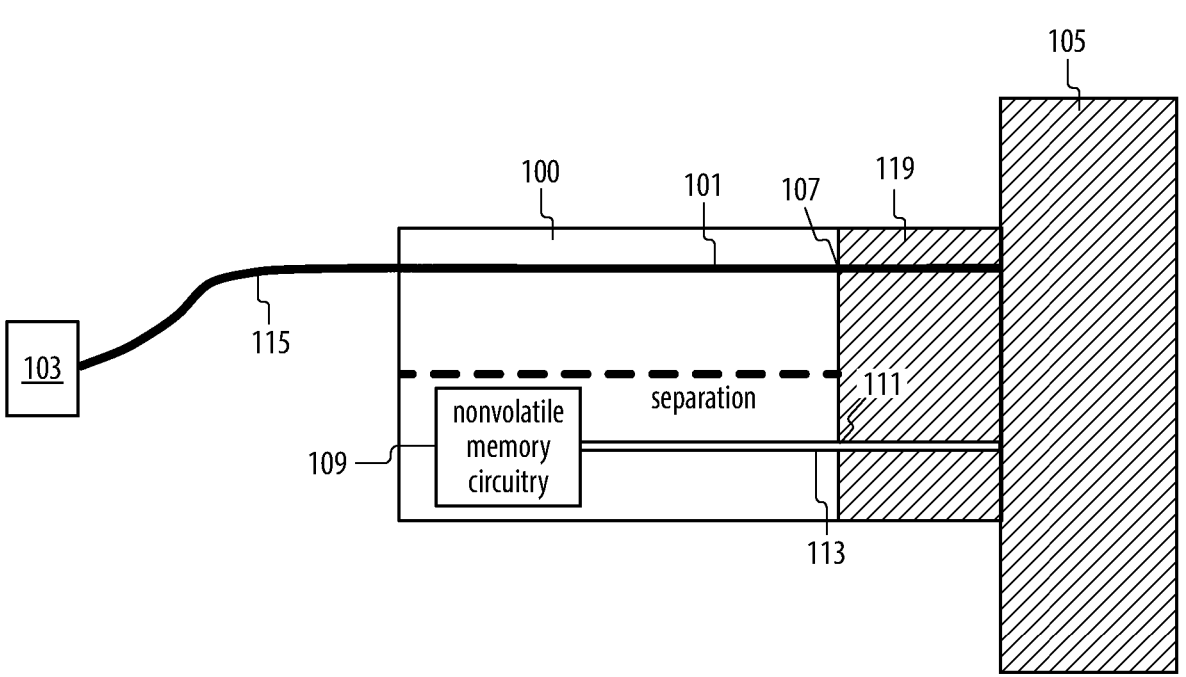
FIG. 1 is a schematic diagram of an embodiment of a dongle in accordance with this disclosure.

Reference will now be made to the drawings wherein like reference numerals identify similar structural features or aspects of the subject disclosure. For purposes of explanation and illustration, and not limitation, an illustrative view of an embodiment of a dongle in accordance with the disclosure is shown in FIG. 1 and is designated generally by reference character 100. Other embodiments and/or aspects of this disclosure are shown in FIGS. 2 and 3.

Figure 2:
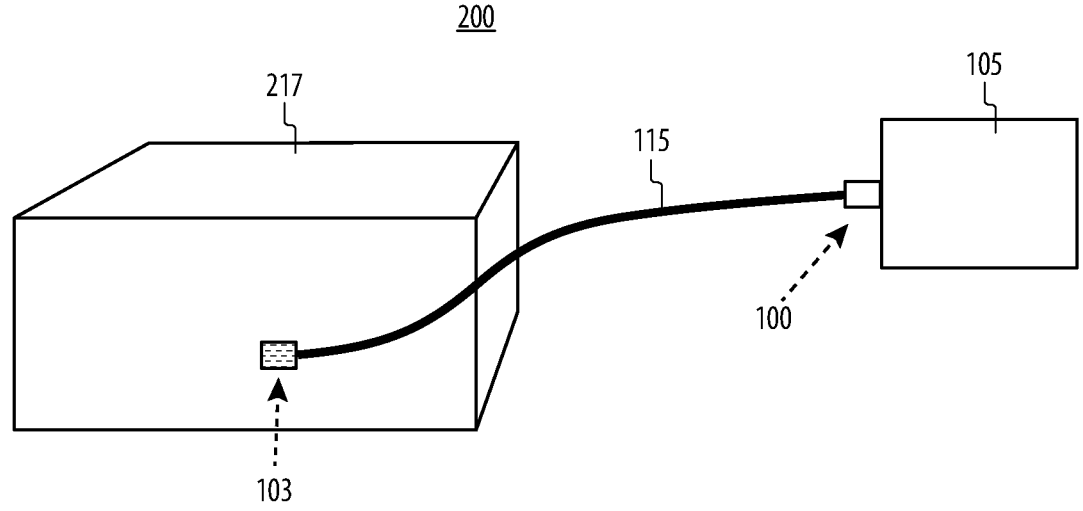
FIG. 2 is a schematic diagram of an embodiment of a system in accordance with this disclosure.
Figure 3:
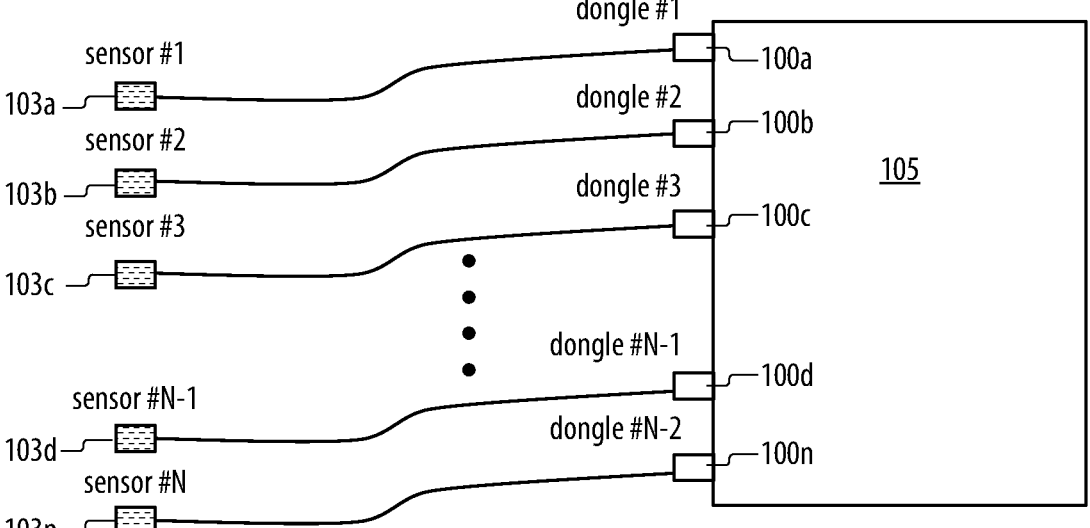
FIG. 3 is a schematic diagram of the embodiment of FIG. 2, shown having a plurality of sensors and respective dongles connected to the data concentrator.

In accordance with at least one aspect of this disclosure, referring to FIGS. 1 and 2, a dongle 100 for a sensor system (e.g., system 200) can include a pass-through signal carrier 101 configured to allow signals from a sensor 103 discretely associated with the dongle 100 to pass through the dongle 100 to a data concentrator 105 via a first connection 107. The dongle 100 can also include a non-volatile memory 109 configured to connect to the data concentrator 105 via a second connection 111. The nonvolatile memory 109 can include calibration data for the sensor 103 that is associated with the dongle 100.

In certain embodiments, the first connection 107 is different than the second connection 111. In certain embodiments, the first connection 107 can be an optical connection and the pass-through signal carrier 101 can be an optical pathway configured to allow optical signals to pass there through (e.g., a fiber cable, a cavity, and/or any other suitable optical components). For example, in certain embodiments, the optical pathway can be an optical fiber as shown in FIG. 1.

In certain embodiments, the second connection 111 can be an electrical connector (e.g., connected directly to the nonvolatile memory 109 or connected via a conductor 113), e.g., as shown in FIG. 1. In certain embodiments, the nonvolatile memory 109 can be connected to the electrical connector to provide digital information to the data concentrator 105. In certain embodiments, the digital information can include sensor calibration data for a discretely associated sensor 103. In certain embodiments, the pass-through signal carrier 101 can be configured to connect to a cable 115 (e.g., at an opposite end to connector 107) to connect to the sensor 103.

The dongle 100 can include any suitable components configured to connect to the data concentrator 105 and/or to the sensor 103 and/or cable 115. In certain embodiments, the dongle 100 can include the cable 115 (e.g., integral with or separately connected to the pass-through signal carrier 101. In certain embodiments, the dongle 100 can include or be configured to connect to a data concentrator connector 119 to connect each connection 107, 111 to the data concentrator 105.

In accordance with at least one aspect of this disclosure, a sensor system 200 can include a sensor 103 and a dongle 100 discretely associated with the sensor 103 and configured to connect to the sensor 103. The dongle 100 can include any suitable dongle disclosed herein, e.g., as described above.

In certain embodiments, the system 200 can include a cable 115. The pass-through signal carrier 101 can be configured to connect to the cable to connect to the sensor. In certain embodiments, the sensor 103 can be a passive sensor. For example, the sensor can be a passive optical fuel sensor, e.g., for placement within, on, or near an aircraft fuel tank 217.

In certain embodiments, the system 200 can include the data concentrator 105. In certain embodiments, the data concentrator 105 can be configured to interrogate the sensor 103 with an optical signal and to receive the digital information from the nonvolatile memory 109 (e.g., at boot up of the system to provide calibration data of the associated sensor 103). For example, the data concentrator 105 can include any suitable control module configured to read the nonvolatile memory 109 at boot up, as well as to interrogate the sensor 103.

In certain embodiments, referring additionally to FIG. 3, the system 200 can include one or more additional sensors 103a, 103b, 103c, 103d, 103n and one or more additional dongles 100a, 100b, 100c, 100d, 100n associated with each additional sensor 103a, 103b, 103c, 103d, 103n, respectively. In certain embodiments, the data concentrator 105 can be configured to interface with the plurality of dongles 100a, 100b, 100c, 100d, 100n to communicate with the plurality of sensors 100a, 100b, 100c, 100d, 100n.

Embodiments can include labels on each associated sensor and respective dongle so they are always plugged in together in the right locations. Certain embodiments can include a unique fiber Bragg grating on the optical pathway of each sensor to uniquely identify each sensor on the optical line. A control module (e.g., at the data concentrator or elsewhere) can see this modulated signal and can determine a serial number from this passive modulation such that the control module can compare this information to the serial number stored on the nonvolatile memory to ensure that the correct calibration coefficients are used and/or that the correct sensor is plugged in. In this regard, a sensor only would need to encode a serial number instead of all coefficients (which reduces the complexity of the sensor and/or signaling scheme) since the dongle would have all the associated calibration coefficients.

Certain embodiments can include an electrical pathway for the storage medium and an optical pathway for sensor interrogation and received signal. In certain embodiments, there may be no other electrical components in the dongle. In certain fuel applications, it may not be desired to have an electrical pathway to the fuel tank, however other applications could use an electrical connection instead of an optical connection (e.g., which could still be isolated from the nonvolatile memory to avoid cross-over). Embodiments allow placement of a passive sensor anywhere, and active electronics can be retained at the data concentrator.

In case of a pressure-based fuel gauging system (PBFGS), there might be N pressure sensors installed across aircraft tanks, N being for example 20. The PBFGS data concentrator will independently interrogate each of N pressure sensors through its dedicated data acquisition channel and resulting sensor data will be processed using calibration coefficients derived for the specific physical sensors connected to each channel. If a pressure sensor needs to be replaced, then the flight software should use calibration coefficients applicable to the new replacement sensor instead of the old calibration coefficients that were previously used for the now failed sensor.

One way to address this issue is to include a calibration coefficient table as part of flight software. It requires that a different data file be used on each aircraft. This method is practical for technology demonstrator programs, where a new software version is produced and deployed for a new system prototype, and where all prototype sensor units produced so far are completely characterized prior to the system deployment. The method may not be practical in a production system, where the same software version needs to be certified for use on multiple aircrafts, prior to production and calibration of new sensor units. A workaround would be to include new data files with each new sensor set but keep the executable software intact. Even with this approach, new data files would have to be loaded for each new installation, and also after each field repair. Making sure that each new data load corresponds to the correct set of physical sensors may be a significant configuration management challenge. Furthermore, the requirement to update the software configuration after each repair would add significant complexity to the process.

To bypass the necessity to reprogram the system software, calibration coefficients may be included as part of a sensor assembly. In case of sensors with active electronics this may be easily done by including small non-volatile memory (e.g. EPROM) within each sensor. The flight software may be kept unchanged over all aircraft of the same type, as it acquires calibration data from the sensor itself, e.g. at the system startup. This method may be challenging to implement for passive sensors which do not incorporate any active electronics. In some cases it may be possible to modify sensor's physical characteristics to encode some simple digital information in its passive response. However, this may be challenging in case of more complex calibration data. For example, calibration data for a MEMS pressure sensor may comprise more than 20 coefficients. Even if each calibration coefficient is parsimoniously implemented as a 2-byte fixed-point number, the entire calibration data set could require 320 bits to be encoded in a passive sensor's response. For some types of calibration equations and for applications requiring high sensing accuracy, numerical resolution of calibration coefficients may have to exceed 16 bits. Encoding such a rich set of data in sensor's passive response may not be feasible. Furthermore, such physical modifications to the sensor might modify its sensitivity and in fact could invalidate previous calibration measurements.

The use of passive sensors is attractive on aircraft because of intrinsic safety considerations. Any active electronic circuit raises possibilities of accidental storage of excessive electrical energy, leading to potential discharge, sparking etc. This leads to complicated and costly design practices aimed at elimination of such hazards. On the other hand, passive sensors do not store energy and their response is in essence an echo of the interrogation signal. This allows shifting most of safety concerns onto interrogator hardware, allowing simpler and less expensive designs.

The above concerns are particularly acute in fuel measurement applications in aircraft. Inclusion of active electronics submerged in fuel is preferably avoided. For this reason, passive pressure sensors are now being considered for next generation fuel systems. It is very likely that to achieve required system accuracy levels, each such sensor may have to be individually calibrated, similar to active MEMS-based pressure sensors. Such calibration should happen in factory, prior to installation on aircraft, in order to reduce installation time on aircraft at the final assembly line. Embodiments provide a method to transfer sensor-specific calibration data to the aircraft without having to reload flight software after every sensor replacement, all the while preserving the passive nature of the sensor.

Embodiments can include with each passive sensor a corresponding connector dongle that includes all the necessary calibration data associated with the particular physical sensor device. When sensor hardware is shipped, it can be kitted as two-element sets, with a unique dongle associated with each sensor unit. The sensing part can be passive so that it is suited for example for aircraft fuel tank environment. The dongle can include simple active electronics, allowing communication of digital calibration data to the data concentrator. The dongle can reside in the same environment as the data concentrator, e.g. outside of the fuel tank, e.g., in the aircraft's equipment bay. Thus, it does not have to be designed for in-fuel environment and can be easily accessible both in assembly and in operation. Also, in certain embodiments where there is no active electronics in the tank, there are no additional concerns about electrical energy sent into the tank, other than those associated with the passive sensor itself.

In production, sensor-specific calibration coefficients can be determined for each sensor, similar to the current practice for example with MEMS pressure sensors. The calibration data can be loaded into nonvolatile memory incorporated within the dongle. The dongle can serve a dual purpose: it can be a pass-through signal carrier for the optical signal from the interrogator to the sensor and back, and it can be a source of digital calibration data associated with the sensor. The readout of the calibration data can be configured to happen only once per flight, e.g., when the interrogator is powered-up, so the speed (bitrate) may be very slow. However, the dongle can be capable of providing calibration data on demand (e.g., from a flight computer) at any time, e.g., as it may not include any means to determine the phase of flight.

The dual function of the dongle can require that each interrogator channel connector provides two connections, one pass-through optical connection for interrogation-response signal to and from the sensor itself, and the active data connection to the non-volatile memory included within the dongle. The latter connection may be a traditional electrical connection for simplicity of designing the non-volatile memory module. The dongle can be designed to prevent any possibility of sending additional energy into the sensor. If the sensor connection is optical and the data connection is electrical, e.g., copper wire, then the separation may be naturally achieved through physical means. On the interrogator/concentrator side, it can be assured that safe levels of optical energy are sent to the sensor, for example.

In a practical aircraft system, an interrogator, or data concentrator, may be connected to multiple sensors. Each sensor can be connected to the interrogator through its own specific dedicated dongle. In order to assure that the correct dongle is used on each data acquisition channel, appropriate configuration management and kitting procedures can be in place. Each sensor/dongle pair can be shipped together as a single unit, so that both are installed at the same time. As part of kitting processes, acceptance test procedures can be performed on each sensor-dongle pair, to assure correct pairing. There may be additional acceptance tests as part of installation procedures, to further reduce the risk of installing incorrect dongles on incorrect connectors. To make installation procedures mistake-proof, human-readable or machine-readable labels (e.g., QR codes) can be added to both parts of each sensor-dongle pair, to facilitate manual verification by installers, for example.

In certain embodiments, the serial number of each sensor may be encoded by physical means into its passive response. The same serial number can be stored in the dongle that is paired with the sensor, and the interrogator can compare the two values and determine if a correct dongle is installed on each data acquisition channel. The sensor serial number may be much simpler to encode in a sensor's response than the entire set of calibration coefficients, for example. Even a production line consisting of a million sensor units, a unique serial number may require 20 bits, which is potentially an order of magnitude less than the entire calibration data set. Modification of the sensor response to encode its serial number may happen in production, prior to sensor's final calibration, and its effect can be included in sensor calibration data.

Embodiments can decouple the process of generating sensor-specific calibration coefficients from software generation and certification. Embodiments allow for no calibration data to be included in flight software or its data tables. A single version of flight software and associated configuration data can be deployed on the same version of aircraft. Sensor installation may not require any software loads or updates, which reduces touch time. In initial aircraft assembly, an appropriate dongle can be connected to each connector of the unit. The data concentrator can be implemented as a separate box (e.g., as shown in FIG. 1) or as a card or a functional module as a part of a larger multi-function box, for example. Any suitable disambiguation of the data concentrator with any suitable hardware and/or software module(s) is contemplated herein.

The dongle can provide the flight software with appropriate configuration data. In operation, a repair may require only replacing two pieces of hardware, e.g., a new sensor and its associated dongle and no software updates are needed. In fuel systems, sensor units on the wet side can be completely passive, and calibration data can be stored in dongles on the dry side.

Embodiments can include each channel having an optical sensor connection and a separate (serial) calibration data connection. Each sensor can be shipped and installed with its correct associated dongle. Software verification, certification, and configuration management can be easier as no sensor-specific calibration data needs to be included in code or data tables. All sensor repairs can require only swapping two pieces of hardware and no software uploads.

Embodiments can include a device and method for calibration-free installation of passive sensors on aircraft. Accurate sensing often requires sensor-by-sensor calibration, necessitating storage of device-specific calibration coefficients. It is desirable to achieve this without requiring to modify software or data files for each aircraft. This is challenging for passive sensors that do not include active electronics. Embodiments can include a method to transfer sensor-specific calibration data to the aircraft without having to reload flight software after every sensor replacement.

In certain embodiments, each passive sensor can be equipped with a corresponding connector dongle that includes all the necessary calibration data associated with this sensor. When sensor hardware is shipped, it can be kitted as two-element sets, with a unique dongle associated with each sensor unit. The sensing part can be passive, e.g., so that it is suited for example for an aircraft fuel tank environment. In production, sensor-specific calibration coefficients can be loaded into nonvolatile memory incorporated within the dongle. The dongle can be a pass-through signal carrier for an optical signal from the interrogator to the sensor and back, and can be a source of digital calibration data associated with the sensor.

Embodiments can include any suitable computer hardware and/or software module(s) to perform any suitable function (e.g., as disclosed herein).

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A sensor system, comprising:
a passive sensor configured to provide a response to an interrogation signal, the response including a serial number corresponding to the sensor, wherein the serial number is encoded in the passive sensor by modifying a physical characteristic of the sensor; and
a dongle discretely associated with the sensor and configured to connect to the sensor, the dongle comprising:
a pass-through signal carrier configured to allow signals from the sensor to pass through the dongle to a data concentrator via a first connection; and
a non-volatile memory configured to connect to the data concentrator via a second connection, wherein the nonvolatile memory includes the serial number for identifying the sensor and calibration data for the sensor.

2. The system of claim 1, wherein the first connection is different than the second connection.

3. The system of claim 2, wherein the first connection is an optical connection and wherein the pass-through signal carrier includes an optical pathway configured to allow optical signals to pass therethrough.

4. The system of claim 3, wherein the optical pathway is an optical fiber.

5. The system of claim 3, wherein the second connection is an electrical connector.

6. The system of claim 5, wherein the nonvolatile memory is connected to the electrical connector to provide digital information to the data concentrator.

7. The system of claim 1, further comprising a cable, wherein the pass-through signal carrier is configured to connect to the cable to connect to the sensor.

8. The system of claim 1, further comprising the data concentrator, wherein the data concentrator is configured to interrogate the sensor with an optical signal and to receive the digital information from the nonvolatile memory.

9. The system of claim 8, further comprising one or more additional sensors and one or more additional dongles associated with each additional sensor.

10. The system of claim 9, wherein the data concentrator is configured to interface with the plurality of dongles to communicate with the plurality of sensors.

* * * * *